United States Patent [19]

Hummel et al.

[11] 4,225,326

[45] Sep. 30, 1980

[54] DEVICE FOR SEPARATING IMPURITIES FROM GASES BY MEANS OF A WASHING LIQUID

[75] Inventors: Walter Hummel, Karlsruhe; Gregor Klinke, Ettlingen, both of Fed. Rep. of Germany; Alberto Prosperi, Carnate, Italy

[73] Assignee: Wiegand Karlsruhe GmbH, Ettlingen, Fed. Rep. of Germany

[21] Appl. No.: 596,817

[22] Filed: Jul. 17, 1975

[30] Foreign Application Priority Data

Jul. 18, 1974 [DE] Fed. Rep. of Germany ....... 2434664

[51] Int. Cl.² ...................... B01D 47/06; B01D 46/42
[52] U.S. Cl. .................................... 55/257 R; 55/314; 261/126; 261/DIG. 9
[58] Field of Search ................. 55/223, 226, 229, 249, 55/250, 257 R, 257 DV, 257 OV, 257 C, 257 IP, 257 PP, 257 HE, 259, 309, 310, 312, 261, 269, 314; 261/17, 126, DIG. 54, DIG. 9

[56] References Cited

U.S. PATENT DOCUMENTS

| 1,010,068 | 11/1911 | Pavella ................................... 261/17 |
| 2,032,404 | 3/1936 | Fisher ........................... 261/DIG. 54 |
| 2,090,994 | 8/1937 | Brandes .................................... 55/259 |
| 2,337,983 | 12/1943 | Fisher ........................... 261/DIG. 54 |
| 3,142,548 | 7/1964 | Krantz .................................... 55/223 |
| 3,426,507 | 2/1969 | Kossowski et al. .................... 55/418 |
| 3,442,232 | 5/1969 | White .................................... 55/259 |
| 3,462,919 | 8/1969 | Zalman .................................... 55/261 |
| 3,582,051 | 6/1971 | Klein .................................... 55/229 |
| 3,713,277 | 1/1973 | Sackett, Sr. ............................ 55/259 |
| 3,881,898 | 5/1965 | Darby et al. ........................ 55/257 C |

FOREIGN PATENT DOCUMENTS 399575 10/1933 United Kingdom ............... 55/257 MP Primary Examiner—David L. Lacey
Attorney, Agent, or Firm—Morgan, Finnegan, Pine, Foley & Lee

[57] ABSTRACT

A device for separating impurities from gases by means of a washing liquid. The device includes three (3) interconnected chambers: a suction chamber, a mixing chamber and a separating chamber, wherein the outer wall of the mixing chamber is the inner wall of the suction chamber and the inner wall of the mixing chamber is the outer wall of the separating chamber. In the upper portion of the mixing chamber there is an inlet which connects the suction and mixing chambers for conveying contaminated gases rising in the suction chamber downwardly into the mixing chamber. In the upper portion of the mixing chamber below the outlet there is mounted a plurality of spray nozzles for downwardly spraying washing liquids which removes impurities in the contaminated gases as they flow downwardly through the mixing chamber. At the bottom of and directly open to the mixing and separating chambers is a liquid collection chamber for collecting used washing liquids and impurities from the gases. In the inner wall of the mixing chamber above the collection chamber is an outlet which conveys the washed gases from the mixing chamber upwardly into the separating chamber. The separator in the separating chamber removes remaining droplets of liquid from the washed gases before the washed gases pass into the surrounding atmosphere. Within an outer wall of the suction chamber there is an exhaust opening which is normally closed. When the device is operating properly the opening remains closed so that the contaminated gases will pass from the suction chamber to the mixing chamber. When there is a breakdown, however, the opening is opened so that the contaminating gases are exhausted from the device without passing therethrough.

7 Claims, 9 Drawing Figures

DEVICE FOR SEPARATING IMPURITIES FROM GASES BY MEANS OF A WASHING LIQUID

The invention relates to a device for separating impurities from gases by means of a washing liquid, with at least a spraying nozzle arranged in a nozzle chamber, directed vertically downwards and loaded with the washing liquid, with a feeding opening leading to this nozzle chamber for the contaminated gases, with a mixing chamber connected, immediately below the nozzle chamber for mixing the contaminated gases with the sprayed liquid, with a liquid collecting chamber connected, to the mixing chamber and collecting the washing liquid, and with a drip separating chamber connected with the liquid collecting chamber. The invention was first used for washing dust from the dry air of a prilling tower.

Prilling towers are apparatus, wherein a product such as a liquid, highly concentrated and heated urea solution is subdivided into droplets in the upper part of a tower which move downwardly due to gravity ; the air flows from the bottom towards the top, cools the liquid droplets, collects the available residual moisture in the product, warms up as a result and rises because of its buoyancy (chimney action). The dry air collects the finest product as dust which is distributed through the atmosphere. This represents a product loss and, furthermore, an environmental contamination.

Such drying towers may be of a large size, e.g. 18 m in diameter and 60 m in height. Furthermore it is possible to treat therein large amounts of air, e.g. 1,000,000 m$^3$/h.

Washing plants for such drying towers have to have, if possible, either a very limited pressure loss or none at all, since otherwise the chimney effect of the tower would not be sufficient for the air transport. Accordingly for such washing plants use is preferably made of jet washing devices, since they work without pressure loss and, under appropriate circumstances, they are in condition to feed the gas from tanks by their injecting action.

Furthermore, such drying towers, in the event of trouble in the washing plant, may be permitted to run independently of it.

The use of a jet washing plant in the past has involved a very unfavorable and bulky size of plant which required, furthermore, extensive pipes for drawing in and exhausting the air.

Large and accordingly expensive shutoff and change-over devices were required in order to run the washing plant in case of a plant breakdown. As a result, a device having the following features was required:

(a) it had to be of a shape for fitting into or for connection with a structure within a small area and as harmoniously as possible.

(b) it could not have complicated pipes for drawing in and exhausting the gas to be treated.

(c) in case of breakdown, it had to be by-passable with as little expenditure as possible.

This aim, according to our invention, is achieved through apparatus having a nozzle chamber in which there is arranged a series of spraying nozzles spraying a washing liquid between two walls which are mutually connected for mechanical support, whose downwards continuations also define a mixing chamber, and a feeding opening extends through one wall above the series of spraying nozzles while the other wall, at the same time, forms a limiting surface for a droplets separating chamber. Particularly remarkable is the fact that the spraying nozzles may be arranged in series between the two walls without the need for connecting each spraying nozzle with an individual mixing chamber. A group of several spraying nozzles has been already associated with a circularly limited mixing chamber, but this mixing chamber was circular too. It was impossible therefore to insure that the required mixing action occurs even if the spraying nozzles are arranged in series between two walls whose downward continuations also limit the mixing chamber. It will be appreciated that the feeding opening for the contaminated gas extends through one wall over the entire length of the series of spraying nozzles.

The compact total structure, which harmoniously may be incorporated as space saving in a given structure shape or connected to a given structure shape, is limited by the mentioned series arrangement in such a way that the wall, facing the wall containing the feeding opening, forms at the same time a limiting wall of the drip separating chamber. The construction volume of the device is particularly commercial if the nozzle chamber, the mixing chamber, the liquid collecting chamber and the drip separating chamber are annular.

The valve opening areas have to be well mutually adjusted if the drip separating chamber lies radially inside or outside the nozzle chamber and the mixing chamber and if the annular liquid collecting chamber lies both under the mixing chamber and the drip separating chamber. These features involve further a compact complete structure.

Even from the point of view of a compact complete structure it is preferable to connect the nozzle chamber, through the feeding slit, with a suction chamber, one of its limiting wall being formed by the limiting wall, turned away from the drip separating chamber of the nozzle chamber and of the mixing chamber.

In order to by pass the device, in case of its breakdown, with a least expenditure, i.e. the contaminated gas being not obliged to pass through the device, in the wall of the suction chamber facing the nozzle chamber there are normally closed exhaust openings leading to the atmosphere which can be opened during a breakdown.

Preferably the complete structure of the device is such that at least one of its outside walls form an outside wall of a building or is connected with an outside wall of a building.

The invention will be hereinafter illustrated by means of embodiments.

Figure 1:
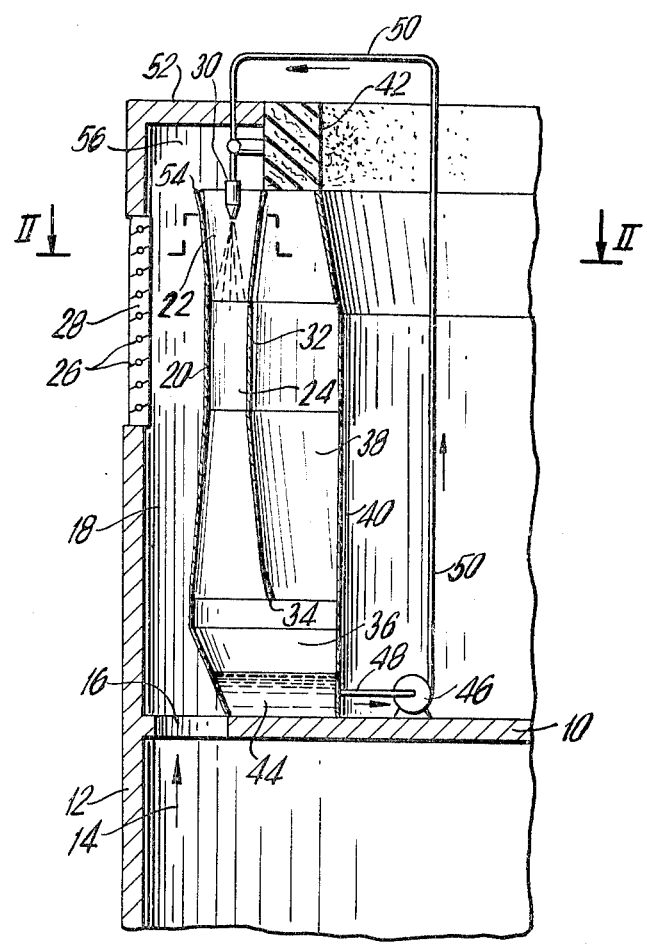
FIG. 1 shows the upper end of a tower, provided with the device of our invention, having a round cross section.
Figure 2:
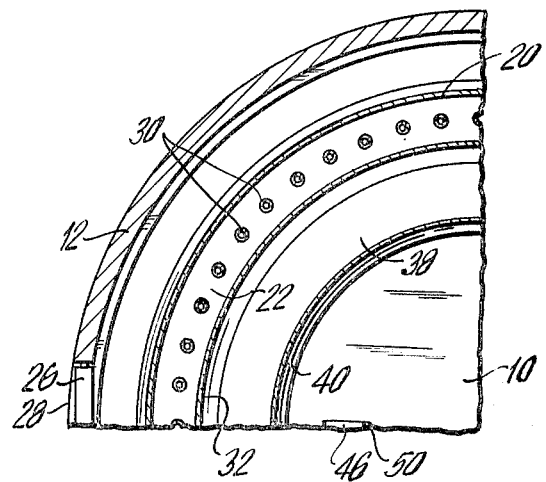
FIG. 2 shows a section through the device of FIG. 1 along line II—II.

The device of FIGS. 1 and 2 is arranged on an intermediate bottom 10 of a circular tower 12. In the tower 12 and in the direction of arrow 14, contaminated gas enters suction chamber 18, through an opening 16 in the bottom 10. Chamber 18 is located between the outside wall of the tower 12 and an inner annular wall 20, which forms the outer wall of an annular nozzle chamber 22 and an annular mixing chamber 24 connected therewith. Between the tower cover 52 and the top edge 54 of the wall 20 there is a slit 56, through which the contaminated gas, rising in the suction chamber 18, may reach and enter the nozzle chamber 22. About at the level of the nozzle chamber 22 in the outside wall of the tower 12 there is a window opening 28 fitted with shutters 26 having a lock and key. The spraying nozzles 30 are mounted in the annular nozzle chamber 22 to point downwardly.

The nozzle chamber 22 and the mixing chamber 24 have an inner annular wall 32 whose lower edge 34 ends above a liquid collecting chamber 36.

The distance between adjacent nozzles 30 is about the same as the distance between the walls 20, 32 in the zone of the nozzles 30.

Possible supports between the walls 20 and 32 are not shown.

Such supports are provided, if required, for increasing the mechanical stability of the walls.

Inside the wall 32 there is a chamber 38 having an inner annular wall 40 and serving as a transition for the droplets, still existing in the liquid collecting chamber 36. The chamber 36 extends upwards to a drip separator 42 which is likewise annularly arranged. This drip separator 42 opens upwards into the open.

The liquid 44 separated and collected in the liquid collecting chamber 44 is recycled, by means of a pump 46, through the pipes 48 and 50 to the nozzles 30.

An arrangement (not shown) for the gradual replenishment of the liquid 44 with fresh liquid may be provided.

Figure 3:
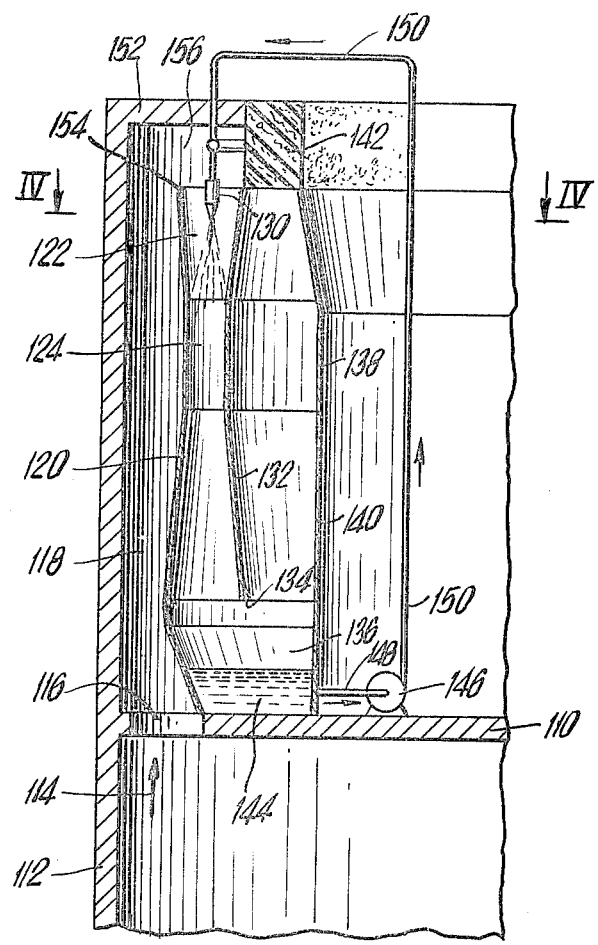
FIG. 3 shows a device similar to the one illustrated in FIG. 1 but, having a rectangular cross section.
Figure 4:
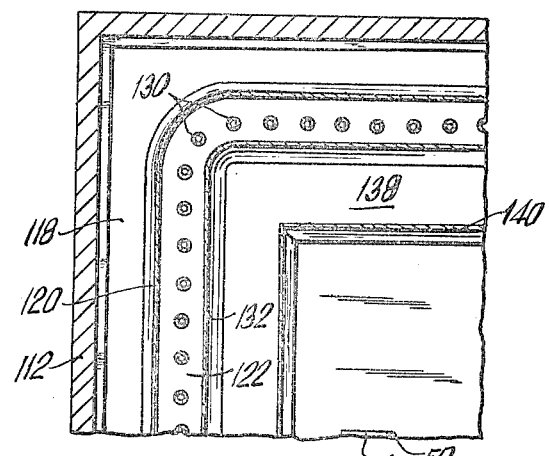
FIG. 4 shows the device of FIG. 3 in section along line IV—IV.
Figure 5:
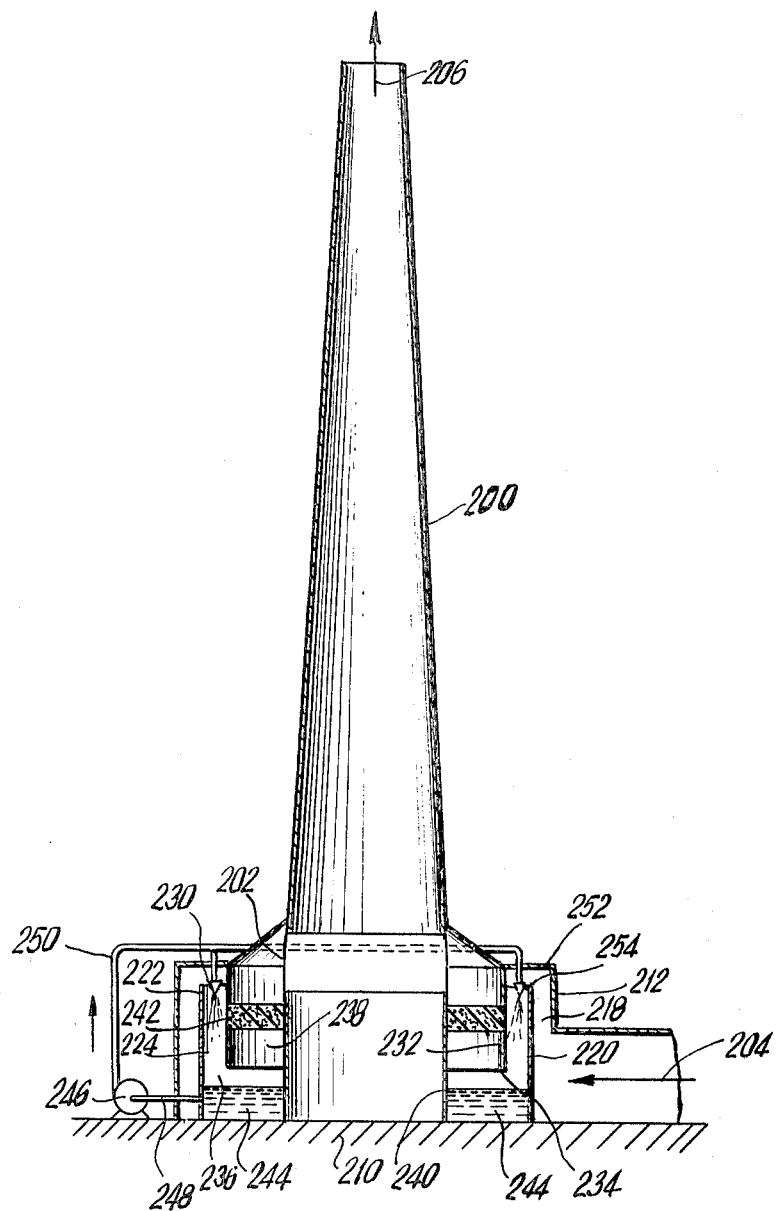
FIG. 5 shows the device at the foot of a chimney in vertical section.

The device of FIGS. 3 and 4 has substantially the same structure as the devices of FIGS. 1 and 2. Accordingly the reference numerals used in FIGS. 1 and 2, increased by 100, designate like ports and a detailed description thereof is unnecessary. The chimney 200 of FIG. 5 has at its base an opening 202, through which the gas freed from the impurities may escape upwards. The contaminated gas flows, in direction of the arrow 204, into a suction chamber 218 and therefrom by means of a device, as substantially shown in FIGS. 1 and 2, into the chimney 200, from which washed gas escapes, in the direction of the arrow 206. Since the assembly is substantially the same as the one of FIGS. 1 and 2, a detailed specification is unnecessary.

As to the ones of FIGS. 1 and 2, the corresponding numeral references are increased by 200.

Figure 6:
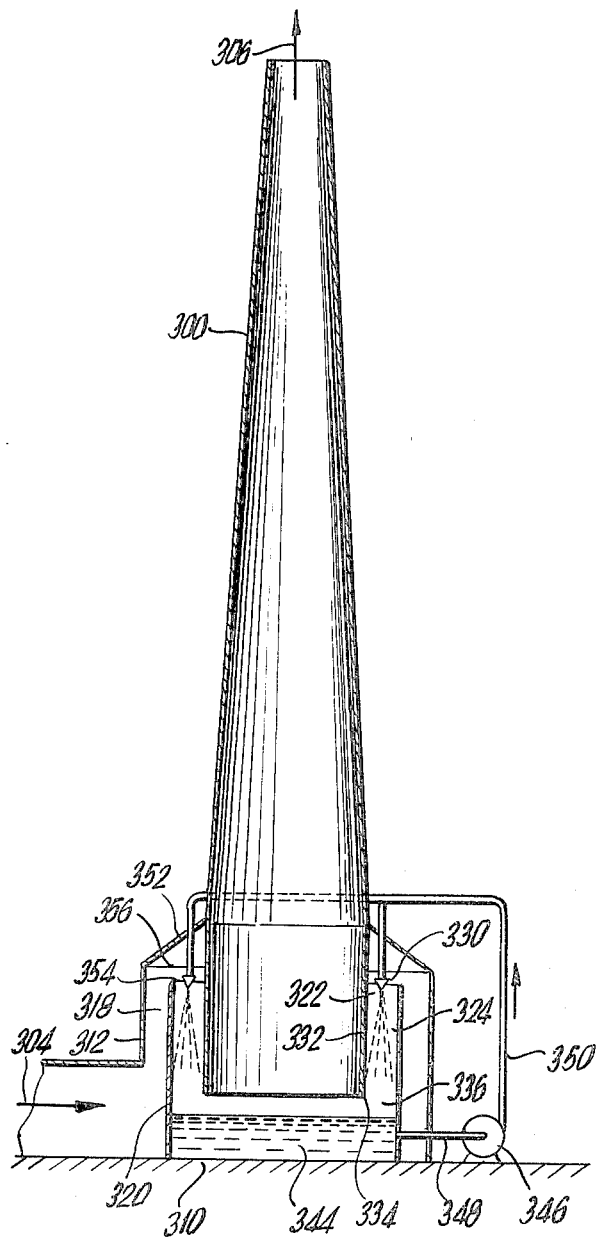
FIG. 6 shows a further embodiment of the device at the foot of a chimney.
Figure 7:
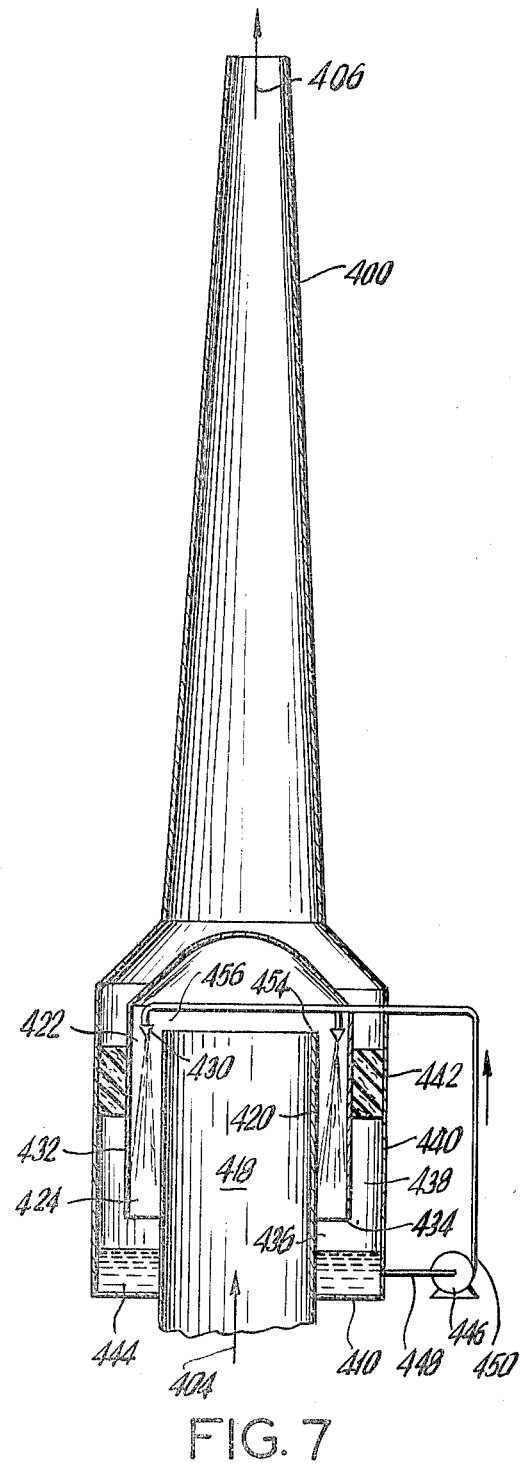
FIG. 7 shows a third embodiment of the device at the foot of a chimney.
Figure 8:
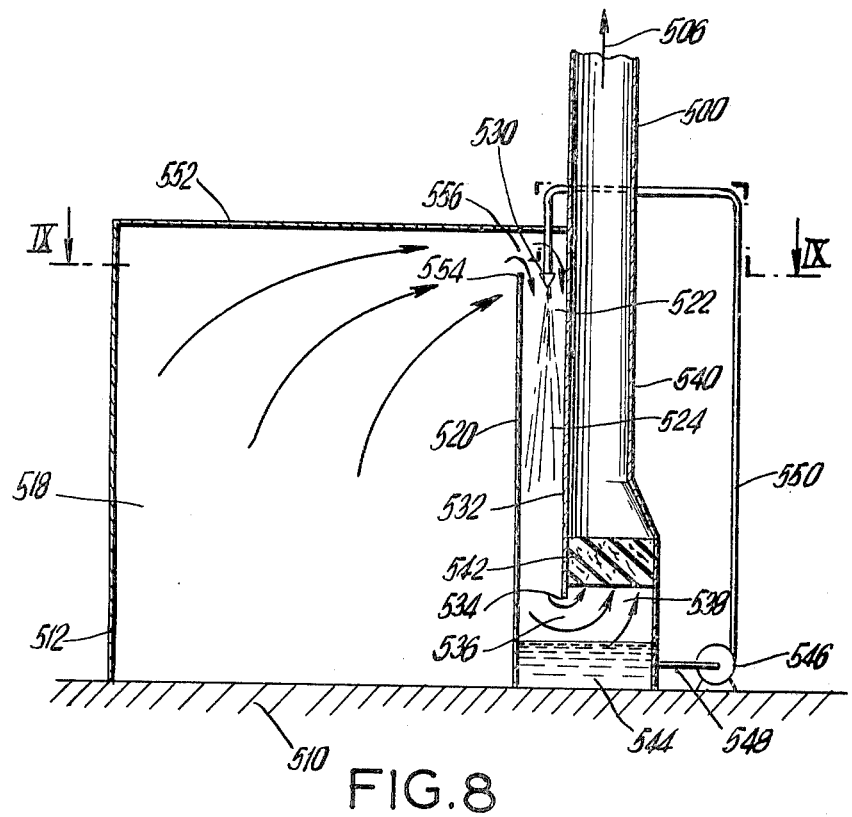
FIG. 8 shows a device at the sidewall of a sucking chamber having a reactangular section.
Figure 9:
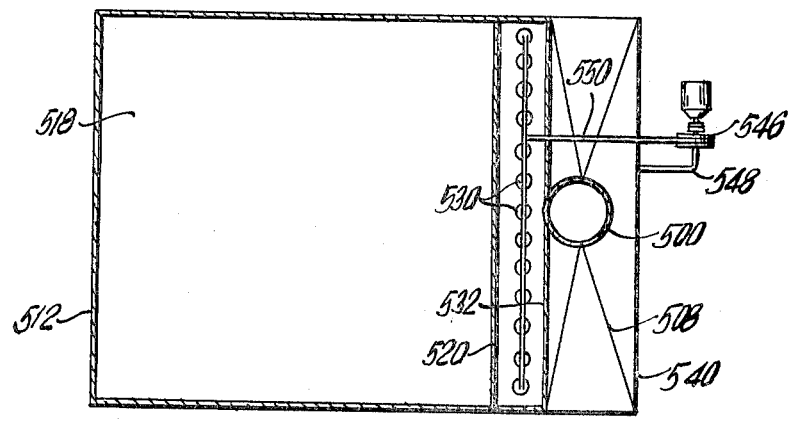
FIG. 9 shows a section through the device of FIG. 8 along line IX—IX.

According to the embodiment of FIG. 6, the chimney 300 serves as drip separating chamber and drip separator. Here too the assembly is like the one of FIGS. 1 and 2. The numeral references are therefore increased by 300. According to the embodiment of FIG. 7 the feeding of contaminated gas to the base of the chimney 400 occurs from the bottom in direction of the arrow 404. As to the further essential features of this embodiment, they can be seen in FIGS. 1 and 2. The reference numerals are increased by 400. According to the embodiments of FIGS. 8 and 9 the device is arranged at one side of a rectangular building element enclosing the suction chamber 518. A linear series of nozzles 530 is arranged in a corresponding elongated nozzle chamber 522. On top of the drip separator 542 there is a complete hip roof 508 with a chimney 500 at its point. In this embodiment, the reference numerals of FIGS. 1 and 2 have been increased by 500.

What we claim is:

1. A device for separating impurities from gases, comprising:
    three inter-connected chambers, a suction chamber, a mixing chamber and a separating chamber, wherein the outer wall of said mixing chamber is the inner wall of said suction chamber and the inner wall of said mixing chamber is the outer wall of said separating chamber,
    an inlet positioned in said suction chamber for conveying contaminated gases thereto,
    an inlet in the upper portion of said mixing chamber outer wall connecting said suction and mixing chambers for conveying contaminated gases moving through said suction chamber downwardly into said mixing chamber,
    a plurality of spray nozzles mounted within the upper portion of said mixing chamber below said inlet for downwardly spraying washing liquid which removes impurities in the contaminated gases as they flow downwardly through said mixing chamber,
    a liquid collection chamber at the bottom of and directly open to said mixing and separating chambers for collecting used washing liquids and impurities from the gases,
    an outlet in said inner wall of said mixing chamber above said collection chamber for conveying the washed gases from said mixing chamber upwardly into said separating chamber,
    and a separator in said separating chamber for removing droplets of liquid from the washed gases before the washed gases pass into the surrounding atmosphere,
    said suction chamber having an outer wall with an exhaust opening at about the level of said nozzles which leads to the atmosphere, and means connected to said outer wall adapted to open and close said opening, wherein said means is closed during normal operation of the device to prevent contaminated gases from being exhausted to atmosphere, and wherein said means is opened when the device is not operating properly so the contaminated gases can be passed to atmosphere without passing through the device.

2. The device according to claim 1 wherein said mixing, liquid collecting and separating chambers have an annular configuration.

3. The device according to claim 2 where said separating chamber lies radially inside of said mixing chamber.

4. The device according to claim 2 where said separating chamber lies radially outside of said mixing chamber.

5. The device according to claim 1 wherein the device includes an outside wall which forms an outside wall of a building.

6. The device according to claim 1 wherein the device includes an outside wall which is connected to an outside wall of a building.

7. A device for separating impurities from gases, comprising:
- three inter-connected chambers, a suction chamber, a mixing chamber and a separating chamber, wherein the outer wall of said mixing chamber is the inner wall of said suction chamber and the inner wall of said mixing chamber is the outer wall of said separating chamber,
- an inlet in the lower portion of said suction chamber for conveying contaminated gases thereinto,
- an inlet in the upper portion of said mixing chamber outer wall connecting said suction and mixing chambers for conveying contaminated gases rising in said suction chamber downwardly into said mixing chamber,
- a plurality of spray nozzles mounted within the upper portion of said mixing chamber below said inlet for downwardly spraying washing liquids which removes impurities in the contaminated gases as they flow downwardly through said mixing chamber,
- a liquid collection chamber at the bottom of and directly open to said mixing and separating chambers for collecting used washing liquids and impurities from the gases,
- an outlet in said inner wall of said mixing chamber above said collection chamber for conveying the washed gases from said mixing chamber upwardly into said separating chamber,
- and a separator in said separating chamber for removing droplets of liquid from the washed gases before the washed gases pass into the surrounding atmosphere,
- said suction chamber having an outer wall which includes an exhaust opening extending therethrough in the upper portion thereof at about the level of said nozzles which leads to atmosphere, and shutter means connected to outer wall for opening and closing said opening, wherein said shutter means is closed when the device is operating normally, and wherein said shutter means is opened when the device breaks down to exhaust the contaminating gases in said suction chamber to atmosphere.

* * * * *